Figure 1:
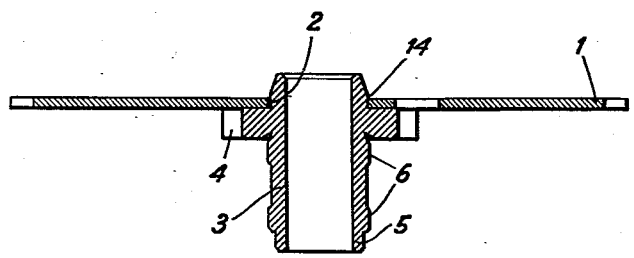

Aug. 8, 1961          H. STAMM          2,995,019
SLIPPING CLUTCH DEVICE
Filed Sept. 3, 1958

Inventor:
Heinrich Stamm
by:
Michael S. Striker
Attorney

United States Patent Office 2,995,019
Patented Aug. 8, 1961

2,995,019
SLIPPING CLUTCH DEVICE
Heinrich Stamm, Grenchen, Switzerland, assignor to ETA A.G. Ebauches-Fabrik, a joint-stock company
Filed Sept. 3, 1958, Ser. No. 758,777
Claims priority, application Switzerland Sept. 6, 1957
12 Claims. (Cl. 64—30)

This invention relates to slipping clutch devices, and more particularly to small slipping clutch devices such as those used in watches.

As well known to those skilled in the art a slipping clutch device is usually inserted in a watch between the watch movement and the motion work to permit of setting the indicating members (hands, disks with indicia, a.s.o.) of the watch. In the known watches the necessary slipping action mentioned is mostly provided between the cannon pinion and the great wheel shaft. The cannon pinion is accordingly mounted on the great wheel shaft, on the one hand, so as to move therewith under the driving action of the watch movement to drive in turn the motion work, and on the other hand, so as to turn freely on that shaft when resetting the watch.

This invention relates, however, to another type of slipping clutch device, which comprises a spindle and a wheel mounted on that spindle, this wheel comprising resilient arms capable of yielding in a radial direction with respect to the wheel, said arms frictionally engaging the spindle to ensure the desired slipping action.

I have disclosed a slipping clutch device of that type in my U.S. Patent No. 2,728,187. The device represented in that patent comprises a cannon pinion and a wheel mounted thereon. In that known device the friction between the wheel and the cannon pinion is adjusted, on the one hand, so that the cannon pinion and the motion work will normally be driven without slipping by the watch movement, and, on the other hand, so that the cannon pinion will turn within the said wheel when the watch is set, the wheel being then indeed held almost immobile by the train of gear wheels of the watch movement.

The wheels of the clutch devices constructed till now in accordance with the U.S. Patent No. 2,728,187 comprise each a hub provided with three resilient arms symmetrically arranged so as to define an equilateral triangle and the wheel is mounted on a truncated conical bearing surface of the cannon pinion so that the resilient arms of the wheel engage the said bearing surface of the cannon pinion at three points set at 120° from one another. In those known devices the resilient arms of the wheels have thus not only the task of ensuring the slipping action of the wheel on the cannon pinion, but also that of holding both pieces exactly coaxial.

Experience has however taught that the three resilient arms of the wheel hub actually do not have exactly the same bending strength. Centering errors often inadmissible thus result from the differences between the bending strengths of the said resilient arms.

It is therefore an object of the invention to avoid those centering errors between said wheel and said spindle.

Another object of the invention is to provide that means for very narrowly limiting the radial or transverse displacements of said wheel with respect to its spindle.

Still another object of the invention is to provide the wheel with rigid parts formed each with a bearing surface portion, said rigid parts being located between said resilient arms, and said bearing surface portions being adjusted with respect to the bearing surface of the spindle on which the wheel is mounted, so that any inadmissible transverse or centrifugal displacement of the wheel with respect to said spindle is avoided.

Further objects of the invention will become apparent in the course of the following description.

One embodiment of the slipping clutch device according to the invention is represented by way of example in the drawings annexed to this specification.

Figure 2:
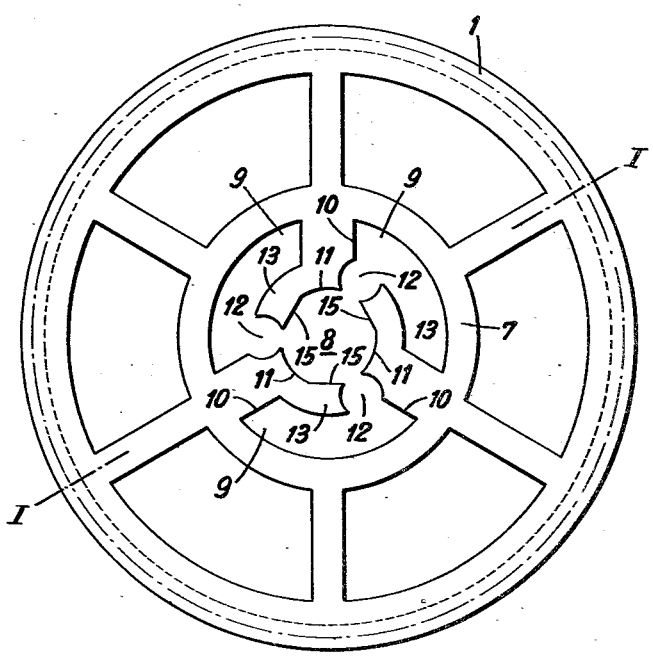

In the drawings:

FIG. 1 is an axial section of said embodiment which comprises a hollow spindle and a wheel mounted thereon, said wheel being cut along the line I—I of FIG. 2, and FIG. 2 is a plan view of the wheel alone.

Referring now to the drawings, the wheel 1 is mounted on a bearing surface 2 of a cannon pinion 3 forming a hollow spindle. The bearing face 2 is of slightly conical shape so that the wheel 1 will be held axially in a predetermined position on the cannon pinion 3. In fact the wheel 1 is pressed by the truncated conical portion of the bearing face 2 against the plane side face of an annular toothed rim 4 of the cannon pinion 3.

The slipping clutch device represented in FIG. 1 can be mounted in a watch either on a cylindrical pin (not shown) fixed in the center of a base plate (not shown) or on a fixed tube mounted in the same manner as said pin if the watch movement is provided with a sweep second hand, said tube serving then to journal a fourth wheel shaft. The minute hand (not shown) is fixed on the bearing surface 5 of the cannon pinion 3 and an hour wheel (not shown) is journalled on the bearing surfaces 6 of this cannon pinion 3. A pinion (not shown) rotatably fixed to the third wheel of the watch movement is meshing with wheel 1 to drive the watch hands.

When the watch is running, the cannon pinion 3 rotates together with the wheel 1 without slipping and its toothing 4 drives a minute wheel (not shown). A pinion fixed to the minute wheel drives in turn the hour wheel twelve times slower than the cannon pinion 3. When the watch is set, a setting wheel (also not shown) meshing with the minute wheel drives the latter, and the cannon pinion must then be able to turn with respect to the wheel 1 which is practically held immobile by the wheels of the watch movement.

In order to permit the slipping clutch device represented in the drawings actually to function in the manner described above, both when the watch is normally running and when it is being set, the hub or bearing portion 7 of the wheel 1 is stamped with three kinds of punches. A first punch provides a central opening 8 in the approximate form of an equilateral triangle with the sides 15 and with rounded corners 11. That opening 8 receives the cannon pinion 3. The hub 7 is further provided with three sector-shaped annular cutouts 9 leaving three rigid radial arms 10. The inner ends of these arms 10 form the rounded corners 11 of the central opening 8. Three bores 12 are finally punched out of the hub 7 by means of circular punches. These bores 12 define three resilient arms 13 extending laterally each from one end of an arm 10. The inner edge of every arm 13 is straight and it forms one side 15 of the triangular central opening 8.

To mount the wheel 1 on the cannon pinion 3 very easily and to avoid a centering error as far as possible the diameter of the circle defined by the inner ends 11 of arms 10 is chosen equal to the greatest diameter of the bearing surface 2.

When mounting the wheel 1 on the cannon pinion 3, the arms 13 are first bent outwards until their inner edges or contact faces 15 pass over the edge 14 of the cannon pinion 3. These arms 13 enter thereafter the annular groove formed by the truncated conical surface 2 between the edge 14 and the plane side face of the annular rim 4 of the cannon pinion 3. When resting in said groove the arms 13 are however not completely unbent. On the contrary, a sufficient tension must still remain in these arms to produce the necessary friction between the wheel 1 and the cannon pinion 3.

Supposing now that one of the three arms 13 has a bending strength smaller than that of the two other arms, it will be understood that the axes of the wheel and of the cannon pinion will be offset, the wheel axis lying on the side of the cannon pinion axis which is opposed to said weaker arm. The distance between both axes remains however very small. It is of course limited to the clearance between the inner ends or contact faces 11 of the rigid arms 13 and the truncated conical bearing face 2 of the cannon pinion 3. In other words, either one of the three resilient arms 13 may move outwards upon a transverse movement of the wheel at most until the two adjacent bearing surfaces 11 come in contact with the bearing surface 2 of the cannon pinion 3.

Experience has shown that the wheel 1 and the cannon pinion 3 may be made so that the greatest centering error of the wheel with respect to the cannon pinion is at most equal to 0002″.

In accordance with the physical properties of the metal chosen for the wheel 1 and in accordance with the friction desired between said wheel 1 and the cannon pinion 3 the arms 13 may be made more or less large.

Instead of using resilient arms with an inner straight edge, arms with a rounded convex inner edge could also be used, as well as arms provided with inner radial ears extending from the inner edge of said arms.

While one embodiment of the invention has been described above in detail, it will be apparent to those skilled in the art that various changes in the shape, sizes and arrangement of parts could be resorted to within the scope of the appended claims without sacrificing the advantages of the invention.

I claim:

1. A slipping clutch device consisting of two rotatable coaxial elements: a spindle having a narrow bearing surface extending in an axial direction with respect to said spindle and a thin wheel mounted on said narrow bearing surface of the spindle, said wheel being provided with a thin stamped hub portion comprising arms capable of yielding in a direction substantially radial with respect to said wheel, each of said arms being composed of a rigid arm portion and a resilient arm portion arranged on said rigid portion and each of said resilient arm portions having an inner narrow face frictionally engaging said bearing surface of the spindle to connect said rotatable elements to one another, whereby one of said elements normally rotates together with the other element, when said other element is driven in rotation and said other element is permitted to rotate alone when a resistance greater than a predetermined value is opposed to the rotary motion of said one element, each of said rigid arm portions being provided with a narrow inner surface portion, the said surface portions of said rigid arm portions forming together a bearing surface adjusted to said bearing surface of said spindle so as to avoid an inadmissible centrifugal displacement of said wheel with respect to said spindle.

2. A slipping clutch device consisting of two rotatable coaxial elements: a spindle having a narrow bearing surface extending in an axial direction with respect to said spindle and a thin plane wheel mounted on said narrow bearing surface of the spindle, said wheel being provided with a thin stamped hub portion comprising arms extending in the plane of said wheel and capable of yielding in a direction substantially radial with respect to said wheel, each of said arms being composed of a rigid arm portion and a resilient arm portion arranged on said rigid portion and each of said resilient arm portions having an inner narrow face frictionally engaging said bearing surface of the spindle to connect said rotatable elements to one another, whereby one of said elements normally rotates together with the other element, when said other element is driven in rotation and said other element is permitted to rotate alone when a resistance greater than a predetermined value is opposed to the rotary motion of said one element, each of said rigid arm portions being provided with a narrow inner surface portion, the said surface portions of said rigid arm portions forming together a bearing surface adjusted to said bearing surface of said spindle so as to avoid an inadmissible centrifugal displacement of said wheel with respect to said spindle.

3. A small slipping clutch device for watches and similar apparatus consisting of two rotatable coaxial elements: a spindle having a narrow and slightly truncated conical bearing surface and an abutting plane face perpendicular to said spindle and adjacent said truncated conical bearing surface, and a thin plane wheel mounted on said narrow bearing surface of the spindle, said wheel being provided with a thin stamped hub portion comprising arms extending in the plane of said wheel and capable of yielding in a direction substantially radial with respect to said wheel, each of said arms being composed of a rigid arm portion and a resilient arm portion arranged on said rigid portion and each of said resilient arm portions having an inner narrow face frictionally engaging said bearing surface of the spindle to connect said rotatable elements to one another, whereby one of said elements normally rotates together with the other element, when said other element is driven in rotation and said other element is permitted to rotate alone when a resistance greater than a predetermined value is opposed to the rotary motion of said one element, said truncated conical bearing surface of the spindle exerting on said wheel an action in an axial direction with respect to said spindle, to firmly apply said wheel on said abutting plane face of the spindle, and each of said rigid arm portions being provided with a narrow inner surface portion, the said surface portions of said rigid arm portions forming together a circular bearing surface having a diameter equal to the greatest diameter of said truncated conical bearing surface of said spindle so as to avoid an inadmissible centrifugal displacement of said wheel with respect to said spindle.

4. A small slipping clutch device for watches and similar apparatus consisting of two rotatable coaxial elements: a spindle having a narrow and slightly truncated conical bearing surface and an abutting plane face perpendicular to said spindle and adjacent said truncated conical bearing surface, and a thin plane wheel mounted on said narrow bearing surface of the spindle, said wheel being provided with a thin stamped hub portion comprising arms extending in the plane of said wheel and capable of yielding in a direction substantially radial with respect to said wheel, each of said arms being composed of a rigid radial arm portion and a resilient arm portion on said rigid arm portion, each of said rigid arm portions being located between a pair of said resilient arm portions in the plane of said wheel, each of said resilient arm portions having an inner narrow face frictionally engaging said bearing surface of the spindle to connect said rotatable elements to one another, whereby one of said elements normally rotates together with the other element, when said other element is driven in rotation and said other element is permitted to rotate alone when a resistance greater than a predetermined value is opposed to the rotary motion of said one element, said truncated conical bearing surface of the spindle exerting on said wheel an action in an axial direction with respect to said spindle to firmly apply said wheel on said abutting plane face of the spindle, and each of said rigid arm portions having an inner end in form of an arc of circle concentric to said wheel, the said inner ends of said rigid arm portions forming together a circular bearing surface having a diameter equal to the greatest diameter of said truncated conical bearing surface of said spindle so as to avoid an inadmissible transverse displacement of said wheel with respect to said spindle.

5. A small slipping clutch device for watches and similar apparatus consisting of two rotatable coaxial elements: a spindle having a narrow and slightly truncated conical bearing surface and an abutting plane face perpendicular to said spindle and adjacent said truncated conical bearing surface, and a thin plane wheel mounted on said narrow bearing surface of the spindle, said wheel being provided with a thin stamped hub portion comprising at least three rigid radial arms located in the plane of said wheel and having each two side faces and an inner end in form of an arc of circle concentric to said wheel, and resilient arms extending in the plane of said wheel transversely each from one of said side faces of said radial arms and capable of yielding in a direction substantially radial with respect to said wheel, said resilient transversal arms having an inner edge frictionally engaging said bearing surface of the spindle to connect said rotatable elements to one another, whereby one of said elements normally rotates together with the other element, when said other element is driven in rotation and said other element is permitted to rotate alone when a resistance greater than a predetermined value is opposed to the rotary motion of said one element, said truncated conical bearing surface of the spindle exerting on said wheel an action in an axial direction with respect to said spindle to firmly apply said wheel on said abutting plane face of the spindle, the said inner ends of said rigid arms forming together a circular bearing surface having a diameter equal to the greatest diameter of said truncated conical bearing surface of said spindle so as to avoid an inadmissible transverse displacement of said wheel with respect to said spindle.

6. In a slipping clutch device consisting of two rotatable coaxial elements: a wheel having a hub portion provided with a central opening therethrough and a spindle having a circular portion located in said opening, the combination of regularly arranged rigid radial arms of said wheel connected to said hub portion of the wheel immovably in radial direction and having each an inner end in form of an arc of circle closely adjacent said circular spindle portion to avoid an inadmissible centrifugal transverse displacement of said wheel with respect to said spindle, and resilient arms of said wheel extending each laterally from one of said rigid radial arms between a pair of adjacent rigid radial arms, said resilient arms being capable of yielding in a direction substantially radial with respect to said wheel and frictionally engaging said spindle portion to connect said rotatable elements to one another while said rigid arms will remain stationary with respect to said hub portion of the wheel, whereby one of said elements normally rotates together with the other element, when said other element is driven in rotation and said other element is permitted to rotate alone when a resistance greater than a predetermined value is opposed to the rotary motion of said one element.

7. In a slipping clutch device consisting of two rotatable coaxial elements: a wheel having a hub portion provided with a central opening therethrough and a spindle having a circular portion located in said opening, the combination of three rigid radial arms of said wheel connected to said hub portion of the wheel immovably in radial direction and disposed at 120° from each other and having each an inner end in form of an arc of circle closely adjacent said circular spindle portion to avoid an inadmissible centrifugal transverse displacement of said wheel with respect to said spindle, and three resilient arms of said wheel extending each laterally from one of said rigid radial arms between a pair of rigid radial arms, said resilient arms being capable of yielding in a direction substantially radial with respect to said wheel and frictionally engaging said spindle portion to connect said rotatable elements to one another while said rigid arms will remain stationary with respect to said hub portion of the wheel, whereby one of said elements normally rotates together with the other element, when said other element is driven in rotation and said other element is permitted to rotate alone when a resistance greater than a predetermined value is opposed to the rotary motion of said one element.

8. In a slipping clutch device, in combination, a driving member and a driven member substantially coaxially aligned for rotation relative to each other; a bearing face axially extending on one of said members; a bearing portion on the other one of said members opposite said bearing face in a radial direction; a plurality of resilient bearing elements on said bearing portion having respective contact faces angularly spaced from each other, said resilient elements tangentially projecting from said bearing portion for engagement of said contact faces thereof with said bearing face, said contact faces defining a first contact surface substantially coaxial with said members; and a plurality of rigid bearing elements on said bearing portion and having respective contact faces angularly spaced from each other, said rigid elements radially projecting from said bearing portion for engagement of said contact faces thereof with said bearing face, said contact faces of said rigid elements defining a second contact surface substantially coaxial with said members and of a cross-sectional area different from that of said first contact surface so that said first contact surface is located between said second contact surface and said bearing face.

9. In a slipping clutch device, in combination, a driving member and a driven member substantially coaxially aligned for rotation relative to each other; a bearing face axially extending on one of said members; a bearing portion on the other one of said members opposite said bearing face in a radial direction; a plurality of resilient bearing elements on said bearing portion having respective contact faces angularly spaced from each other, said resilient elements tangentially projecting from said bearing portion for engagement of said contact faces thereof with said bearing face, said contact faces defining a first contact surface substantially coaxial with said members; and a plurality of rigid bearing elements on said bearing portion and having respective contact faces angularly spaced from each other and from the contact faces of said resilient elements, said rigid elements radially projecting from said bearing portion for engagement of said contact faces thereof with said bearing face, said contact faces of said rigid elements defining a second contact surface substantially coaxial with said members and of a cross-sectional area different from that of said first contact surface so that said first contact surface is located between said second contact surface and said bearing face.

10. In a slipping clutch device, in combination, a driving member and a driven member substantially coaxially aligned for rotation relative to each other; a bearing face of substantially circular cross section axially extending on one of said members; a bearing portion on the other one of said members opposite said bearing face in a radialy direction; a plurality of resilient bearing elements on said bearing portion having respective contact faces angularly spaced from each other, said resilient elements tangentially projecting from said bearing portion for engagement of said contact faces thereof with said bearing face, said contact faces defining a first contact surface of substantially circular cross section substantially coaxial with said members; and a plurality of rigid bearing elements on said bearing portion and having respective contact faces angularly spaced from each other, said rigid elements radially projecting from said bearing portion for engagement of said contact faces thereof with said bearing face, said contact faces of said rigid elements defining a second contact surface of substantially circular cross section substantially coaxial with said members and of a radius of curvature different from that of said first contact surface so that said first contact surface is located between said second contact surface and said bearing face.

11. In a slipping clutch device, in combination, a driving member and a driven member substantially coaxially aligned for rotation relative to each other; a bearing face axially extending on one of said members; a bearing portion on the other one of said members opposite said bearing face in a radial direction; a plurality of resilient bearing elements on said bearing portion having respective contact faces angularly spaced from each other, said resilient elements tangentially projecting from said bearing portion for engagement of said contact faces thereof with said bearing face, said contact faces in the relaxed condition of said resilient members defining a first contact surface substantially coaxial with said members; and a plurality of rigid bearing elements on said bearing portion and having respective contact faces angularly spaced from each other, said rigid elements radially projecting from said bearing portion for engagement of said contact faces thereof with said bearing face, said contact faces of said rigid elements defining a second contact surface substantially coaxial with said members and of a cross-sectional area different from that of said first contact surface so that said first contact surface is located between said second contact surface and said bearing face.

12. In a slipping clutch device, in combination, a driving member and a driven member substantially coaxially aligned for rotation relative to each other; a bearing face of substantially circular cross section axially extending on one of said members; a bearing portion on the other one of said members opposite said bearing face in a radial direction; a plurality of resilient bearing elements on said bearing portion having respective contact faces angularly spaced from each other, said resilient elements tangentially projecting from said bearing portion for engagement of said contact faces thereof with said bearing face, said contact faces in the relaxed condition of said resilient members defining a first contact surface of substantially circular cross section substantially coaxial with said members; and a plurality of rigid bearing elements on said bearing portion and having respective contact faces angularly spaced from each other and from the contact faces of said resilient elements, said rigid elements radially projecting from said bearing portion for engagement of said contact faces thereof with said bearing face, said contact faces of said rigid elements defining a second contact surface of substantially circular cross section substantially coaxial with said members and of a radius of curvature different from that of said first contact surface so that said first contact surface is located between said second contact surface and said bearing face, whereby said one member is held substantially coaxial with said other member by said resilient elements for engagement of said contact faces of said resilient elements with said bearing face, and said members move jointly when one of said members is rotated and the frictional faces set up by engagement of said resilient elements with said bearing face are sufficient to overcome resistance of the other member to rotation, the rigid elements limiting radial displacement of the members from coaxial alignment.

References Cited in the file of this patent

UNITED STATES PATENTS

| | | |
|---|---|---|
| 1,226,810 | Redfield et al. | May 22, 1917 |
| 2,103,781 | Hanson | Dec. 28, 1937 |
| 2,255,742 | Schilling | Sept. 9, 1941 |
| 2,302,110 | Dow et al. | Nov. 17, 1942 |
| 2,720,765 | Drexler | Oct. 18, 1955 |